United States Patent [19]
Moody et al.

[11] 3,891,572
[45] June 24, 1975

[54] PRODUCTION OF STABLE DISPERSION OF SOLID PARTICLES ENCAPSULATED IN SYNTHETIC POLYMER

[75] Inventors: Anthony Gifford Moody, Alvanley; Desmond Wilfrid John Osmond, Windsor, both of England

[73] Assignee: Imperial Chemical Industries Limited, London, England

[22] Filed: Oct. 30, 1969

[21] Appl. No.: 871,767

Related U.S. Application Data

[63] Continuation of Ser. No. 555,989, June 8, 1966, abandoned.

[30] Foreign Application Priority Data
June 10, 1965   United Kingdom............... 24607/65

[52] U.S. Cl......... 252/316; 106/308 M; 106/308 Q; 117/47 R; 117/100 A; 117/100 B; 252/309; 252/314; 424/33
[51] Int. Cl.$^2$... B01J 13/02; B05D 1/02; B05D 3/10
[58] Field of Search........ 252/316; 117/100, 100 A, 117/47 R; 424/33; 106/308 Q, 308 M

[56]   References Cited
UNITED STATES PATENTS

| | | | |
|---|---|---|---|
| 2,613,158 | 10/1952 | Walton et al. | 106/308 X |
| 3,095,388 | 6/1963 | Osmond et al. | 260/4 R |
| 3,138,478 | 6/1964 | Hedman et al. | 117/100 X |
| 3,173,878 | 3/1965 | Reyes | 252/316 |
| 3,265,644 | 8/1966 | Herman et al. | 117/100 X |

*Primary Examiner*—Richard D. Lovering
*Attorney, Agent, or Firm*—Cushman, Darby & Cushman

[57]   ABSTRACT

A dispersion polymerization is carried out in the presence in an organic liquid of stably-dispersed solid particles, such as pigment particles, which have been given a preparatory treatment wherein a polymer which is insoluble in the organic liquid of the polymerization is adsorbed onto the surface of the particles, polymer resulting from the polymerization being deposited on the adsorbed polymer to produce a coating on the particles and thereby encapsulate them.

5 Claims, No Drawings

PRODUCTION OF STABLE DISPERSION OF SOLID PARTICLES ENCAPSULATED IN SYNTHETIC POLYMER

This application is a continuation of Ser. No. 555,989, filed June 8, 1966, now abandoned. su This invention relates to dispersions in organic liquid of solid particles coated with synthetic polymer and to coating compositions based on such dispersions.

Dispersions of synthetic polymers in organic liquid can be made by processes of dispersion polymerisation in which the monomers are soluble but in which the resulting polymer is insoluble, the insoluble polymer so produced being stabilised in the form of disperse particles in the organic liquid by a stabiliser comprising an anchoring component which is associated with the surface of the particles and a pendent chain-like component which is solvated by the organic liquid and provides a stabilising sheath around the polymer particles. The solvated chain-like component may be a polymeric chain or a relatively shorter chain of as few as 12 or 15 co-valently linked atoms in length. In order to be solvated by the organic liquid, this component should be of a degree of polarity similar to that of the liquid. The anchoring component is relatively non-solvated and may be a polymer of nature similar to that of the disperse polymer and associated therewith by the London or Van der Waal interaction or it may be a component, polymeric or non-polymeric, containing polar of dipolar groups and associated with the dispersed polymer by specific interaction with complementary polar or dipolar groups therein.

We have now found that when a dispersion polymerisation is carried out in the presence in the organic liquid of stably-dispersed solid particles, such as pigment particles, which have been given a preparatory treatment wherein a polymer is insoluble in the organic liquid of the polymerisation is adsorbed onto the surface of the particles, polymer resulting from the polymerisation will be deposited on the adsorbed polymer to produce a coating on the particles and thereby encapsulate them.

As a result of the preparatory treatment the solid particles having polymer adsorbed thereon must be stably-dispersed in an organic liquid suitable for use in the dispersion polymerisation and for this purpose a stabiliser of a type as generally described above for use in dispersion polymerisation may be used to stabiliser the particles. One component of the stabiliser must be associated with the polymer adsorbed on the surface of the solid particles and another component must be solvated by the organic liquid to provide the stabilising sheath. In many cases, particularly when the adsorbed polymer is similar to or identical with the polymer to be produced in the dispersion polymerisation, the stabiliser used to stabilise the dispersion of the treated solid particles may be the same as that used in the dispersion polymerisation.

The solid particles may be given their preparatory treatment by first dispersing them in a solution in organic liquid of both the polymer to be adsorbed and the stabiliser. The solid particles may be dispersed by grinding, milling or other technique, and at this first stage they are stabilised in disperse form by polymer adsorbed from the solution, the polymer still being solvated by the organic liquid. The particles may, for example, be dispersed in a solution of the polymer and stabiliser in the liquid or they may be dispersed in a solution of the polymer in the liquid, the stabiliser being added after dispersion of the particles. Alternatively, the polymer and stabiliser may be linked together in the form of a graft copolymer the link being through what, in a separate stabiliser, would be regarded as the anchor component. Adsorption of such a linked molecule on dispersing solid particles in a solution thereof will automatically result in attachment to the particles of the chain-like component which provides the solvated stabilising sheath in the organic liquid of the dispersion polymerisation, and the linked molecule may be regarded as a graft copolymer stabiliser having a relatively large anchor component.

In the second stage of the preparatory treatment the nature of the continuous phase of the dispersion is then modified so that the adsorbed polymer is no longer soluble in it and only one component of the stabiliser, i.e. the chain-like stabilising component is still solvated by it. This modification of the continuous phase may be carried out by adding to the dispersion a liquid which is a non-solvent for the polymer or, if the liquid of the dispersion is a mixture of solvent and non-solvent for the polymer, by removing part or all of the solvent component, e.g. by evaporation or partition. As a result of the modification in solvency of the continuous phase the anchor component of the stabiliser becomes associated with the polymer adsorbed on the disperse particles whilst another component which is chain-like as described above remains solvated by the liquid forming the continuous phase and provides a stabilising sheath around the particles.

Methods of treating disperse particles in this manner are described in co-pending application Ser. No. 555,975, filed June 8, 1966, now U.S. Pat. No. 3,532,662.

The polymer adsorbed on the disperse particles in the preparatory treatment need not be identical with that in which the particles are to be encapsulated in the dispersion polymerisation process. In fact, it is preferred that some or all of the polymer to be adsorbed on the particles in the preparatory coating should contain polar groups which will promote adsorption of the polymer on the surface of the solid. Such polar groups include —COOH, —SO$_3$H, —SO$_4$H, —PO$_4$H$_2$, —PO$_3$H$_2$, and —NR$_1$R$_2$ where R$_1$ and R$_2$ may be aryl, aralkyl, alkyl, cycloalkyl or hydrogen or, together, may form a ring structure which optionally may contain a hetero-atom and optionally may be saturated or unsaturated. The type of polar group will be selected in accordance with the solid particles to be treated, for example, acid groups for particles having basic groups on the surface and vice versa. These polar groups may be incorporated in the polymer, for example, by copolymerisation of a minor proportion of a monomer containing such a group either with a main monomer to form a random copolymer or with chains of the polymer containing a copolymerisable group to form a polymeric chain to which the chains of polymer to be adsorbed are attached, i.e. a segmented copolymer.

When the treated particles have been stably dispersed in the modified organic liquid which is a non-solvent for the adsorbed polymer they may be encapsulated by carrying out a dispersion polymerisation of a polymer which is insoluble in the liquid, for example, by a process as described in British Pat. Specification No. 941,305, or in U.S. Pat. applications Nos. 290,243, filed June 24, 1963 and now U.S. Pat. No. 3,317,635, and 525,315, filed Feb. 7, 1966 and now abandoned.

Any excess free polymer in the preparatory treatment of the solid particles, i.e. polymer which was not associated with a pigment particle but, now being insoluble in the continuous phase, is in the form of a stably-dispersed polymer particle, will of course grow by accretion of polymer in the dispersion polymerisation and so clearly, in order to obtain the maximum degree of particle encapsulation it is important to keep the number of such "pure" polymer particles to a minimum. This can readily be achieved by having present in the preparatory treatment no more than that amount of polymer required to treat the particles. This will vary with the particle size or surface area of the dispersed particles to be treated, but in any particular case the optimum proportion of polymer to particles can be determined by simple trial. After the modification of the continuous phase any excess polymer in the form of "pure" polymer particles not associated with the original solid particles can easily be detected by centrifugation when the relatively dense treated particles can readily be separated out leaving the less dense pure polymer particles still in suspension where they are easily detectable and their proportion determinable on separation by further centrifugation.

As a general rule, suitable proportions of polymer for adsorption will be in the range $0.001 - 0.05$ gms./m.$^2$ of particle surface, preferably in the range $0.003 - 0.01$ gms./m.$^2$, but as a final check on the suitability of the proportion in any particular case the above-mentioned simple test can be applied. Further, in order to ensure adequate stabilisation after the modification step the stabiliser present should provide a constituent still solvated by the modified continuous phase in a proportion in the range 5 to 100 percent by weight of the polymer, preferably 15 to 45 percent. The most suitable proportion to use in any particular case will depend, for example, on the length of the stabilising solvated chain; in general, the longer this is, the more of it will be required.

The size of the disperse solid particles present in the dispersion polymerisation is not critical; it may range, for example, from a few hundred A to $10\mu$, and the growth in size of the particles on encapsulation will depend on the amount of polymer required to be coated onto the initially-dispersed particles to achieve any desired solid/polymer ratio. For example, where the solid is a pigment and the encapsulated pigment particles are to be used in paint compositions, the proportion of pigment to polymer may range from 2.5 to 25 percent by volume depending on the nature of the pigment and of the final paint composition. Once dispersion polymerisation and coating of the dispersed particles as commenced, the particles will thereafter behave as would 100 percent-polymer particles in the dispersion polymerisation and polymerisation may be continued as long as the particles remain stably-dispersed up to a disperse phase volume of 50 percent or higher.

We have found that the resulting dispersions of encapsulated particles are of particular value in the preparation of pigmented coating compositions. Coating compositions made by dispersing pigment in stable polymer dispersions made by dispersion polymerisation are known. These dispersion-type coating compositions were pigmented by addition of dispersed pigment to the polymer dispersion and so, when mixtures of pigments were used, the possibility of pigment separation or migration on application of the composition, giving rise to the defects of flooding or floating, could still arise. We have found that during the modification step in the preparation treatment some aggregation of mixed pigment particles may take place and when these mixed aggregates are encapsulated the pigment particles are then, so to speak, locked in position in the film-forming polymer which, even during integration of the polymer particles into a film, does not normally become sufficiently fluid for the different pigment particles to separate or migrate.

Further, it was found in dispersion coating compositions that the most suitable polymer dispersions to use, from the point of view of obtaining the glossiest film on integration, were those having a polymer particle size of about $0.1\mu$ to $0.5\mu$. However, one minor disadvantage of such coating compositions was that evaporation of the liquid continuous phase at temperatures below that at which integration of the polymer particles takes place could result in "mud-cracking" which showed up as a defect in the finally integrated paint film.

We have now found that if dispersion coating compositions are based on encapsulated pigment of overall particle size not less than $0.75\mu$ the tendency to mud-crack is markedly reduced and at particle sizes of about $1\mu$ is substantially eliminated.

A wide variety of particulate solids may be encapsulated in polymer by the process of this invention. These include pigments, pesticides, herbicides, blowing agents, catalysts and metallic powders. Typical pigments which may be encapsulated for use, for example, in coating compositions or in moulding powders include inorganic types such as titanium dioxide, zinc oxide, antimony oxide, red oxide, yellow oxide, lemon chrome, Prussian blue and cobalt blue, organic types such as azo pigments, quinacridone pigments, indigoid and thioindigoid pigments and phthalocyanine blues and greens, metal containing organic pigments, lakes and carbon blacks such as vegetable black.

The solid particles may be encapsulated in a wide variety of polymers derived from ethylenically unsaturated monomers such as acrylic and methacrylic acids, esters, nitriles and amides of such acids, vinyl acetate, vinyl chloride, vinylidene chloride, vinyl chloracetate, vinyl stearate, methyl vinyl ether, styrene, vinyl toluene, $\alpha$-methyl styrene, isoprene and butadiene. Mixtures of monomers may be used.

The nature of the encapsulating polymer will be related to the nature of the organic liquid of the dispersion polymerisation since, as stated above, it must be insoluble therein. Broadly there are three types of systems; (1) where the polymer is insoluble because it is polar relative to the organic liquid, (2) where the polymer is insoluble because it is non-polar relative to the organic liquid, and (3) where the polymer is insoluble in all common organic liquids because of its molecular structure and irrespective of any question of relative polarity.

Systems typical of the first case are those in which the polymer is polar and the organic liquid is of a non-polar nature, the most common liquids of this type being aliphatic hydrocarbons, such as white spirit and iso-octane. With very highly polar polymers slightly more polar organic liquids, such as aromatic hydrocarbons, fatty esters and fatty ketones may be used. The organic liquid may, of course, be a mixture provided that the mixture itself is of suitable polarity relative to the polymer.

Suitable polar polymers for use in systems of the first type include esters of unsaturated acids with lower alcohols, e.g. acrylic, methacrylic and ethacrylic acid esters of methyl, ethyl and butyl alcohol. In homopolymers of such esters butyl alcohol is the highest alcohol which can be used and preferably this ester is used as a co-monomer with a more polar monomer. Higher alcohols, e.g. octyl and lauryl, can be used provided the polymers also contain an additional polar group to compensate for the longer non-polar carbon-carbon chains. For example, the esters may be copolymerised with a minor proportion of a highly polar monomer such as acrylic or methacrylic acid. Mono-esters of glycols having a free hydroxyl group may be used, the hydroxyl group providing an additional polar effect. Alternatively, the free hydroxyl group may be esterified with a polar acid such as acetic or formic or it may be etherified with a polar alcohol such as methanol, as illustrated by, e.g. β-ethoxy ethyl methacrylate.

A similar type of polar polymer is produced from a monomeric ester of ether of an unsaturated lower alcohol such as vinyl alcohol. The esters may be of hydrofluoric acid and lower acids such as acetic, chloracetic, propionic and formic. Where higher acids are used then they should also contain an additional polar group to produce a sufficiently polar polymer, for example, the acid may be a dicarboxylic acid, such as oxalic, in which the second carboxylic group is left free or is esterified with a lower alcohol such as methyl or ethyl alcohol. Alternatively, the acid may contain a hydroxyl group, e.g. lactic or citric acid, the hydroxyl group being left free or reacted, e.g. acetylated. Or the acid may contain an amino group, e.g. glycollic acid may be used, the amino group providing the additional polarity required.

Similar principles are applicable to ethers of unsaturated lower alcohols.

The second type of system, makes use of polar organic liquids, such as methanol, ethanol, acetone, glycol and, in extreme cases, dimethyl formamide and methyl formate. Such polar organic liquids may contain a minor proportion of water. In this type of system the polymer is relatively non-polar.

The amount of water which can be tolerated in the polar organic liquid will be determined by the solubility in the mixture of the monomer to be polymerised. In order to carry out a dispersion polymerisation the solubility of the monomer should be at least twice the highest free monomer likely to arise in the polymerisation process and in most cases this imposes a limit of about 25 percent by weight of water in the mixture.

Polymers of hydrocarbons such as styrene, vinyl toluene, divinyl benzene, diisopropenyl benzene, isoprene, butadiene, isobutylene and ethylene, are suitably non-polar. Other non-polar polymers are those of higher fatty esters of unsaturated acids such as acrylic, methacrylic and ethacrylic acids. In these cases, the alcohol component of the ester contains a long carbon-carbon chain to produce a polymer of suitable non-polarity. Cetyl alcohol is a typical alcohol. Lauryl alcohol is about the lowest alcohol which can be used in homopolymer esters and preferably esters of this alcohol are used as co-monomers with more non-polar monomer. In addition, one can use partial long-chain esters of a polyol, e.g., glyceryl distearate, dilaurate or dibehenate, the remaining hydroxyl of the glycerol being esterified with the unsaturated acid.

Alternatively, one can use in this second type of system higher fatty esters or ethers of unsaturated alcohols such as vinyl and allyl alcohol. Suitable acid components of such esters are stearic acid, behenic acid and mono-esters of dibasic acids such as cetyl or lauryl adipate of sebacate. Suitable ethers are those of cetyl alcohol or of glycerol distearate, dilaurate or dibehenate.

In general, in this second type of system the disperse polymer is insoluble by reason of it containing long carbon-carbon chains.

In the third type of system, the organic liquid may be of any polarity, e.g., aliphatic hydrocarbon, benzene or ethyl acetate. In this case, the polymer is insoluble irrespective of its relative polarity. Such polymers include, for example, those of vinyl chloride, vinylidene chloride and acrylonitrile.

Similarly, the nature of the stabilising solvated constituent of the stabiliser, both for the solid particles in the modified organic liquid of the preparatory treatment and for the encapsulating polymer in the dispersion polymerisation, will be related to the nature of the organic liquid of the dispersion but in this case they will need to be of similar polarity.

Where the organic liquid of the dispersion is mainly aliphatic hydrocarbon in nature, e.g., pentane, hexane, heptane and octane, the following are examples of suitable chain-like components which would be solvated by the liquid:

long paraffinic chains such as occur in stearic acid; self polyesters of —OH fatty acids such as 12—OH stearic acid or the polyesters occurring in carnauba wax, polyesters of di-acids with diols, e.g., polyesters of sebacic acid with 1,12-decane diol or of adipic acid with neo-pentyl glycol; polymers of long chain esters of acrylic or methacrylic acid, e.g., stearyl, lauryl, octyl, 1-ethyl hexyl and hexyl esters of acrylic or methacrylic acid; polymeric vinyl esters of long chain fatty acids; polymers of ethylene, propylene, butadiene and isoprene.

The organic liquid may, of course, be a commercially available hydrocarbon mixture, such as mineral spirits and white spirit, which also are suitable. Where the organic liquid is mainly aromatic hydrocarbon in nature, e.g., xylene and xylene mixtures, benzene, toluene and other alkyl benzenes and solvent naphthas, similar solvatable components may be used and, in addition, shorter chain analogues, e.g., polymers of ethoxy ethyl metacrylate, methyl methacrylate and ethyl acrylate.

Other components suitable for use in this type of organic liquid include:

aromatic polyesters, e.g., oil-modified alkyd resins;
aromatic polyethers;
aromatic polycarbonates; and
polymers of styrene and vinyl toluene.

Where the organic liquid is polar in nature, e.g., an alcohol, ketone or ester, optionally with a minor proportion of water, suitable solvatable components include:

aliphatic polyethers;
polyesters of short chain acids and alcohols;
polymers of acrylic or methacrylic esters of short chain alcohols.

The above description of the relationship of the organic liquid to the polymer and the stabilising chain-like component of the stabiliser indicates the nature of the modification required to be made to the organic liquid continuous phase in the preparatory treatment of the disperse solid. In general, in the first stage the organic liquid in which the solid is dispersed is necessarily a strong organic solvent since it must dissolve the polymer to be adsorbed and the stabiliser. Such liquids include ketones, e.g., acetone, and esters, e.g., phthalate esters commonly used as plasticisers. During the modification step, this strong solvent is diluted with a non-solvent which may be non-polar, e.g., an aliphatic hydrocarbon, or highly polar, e.g., methanol or even water, depending on the polarity required in the modified continuous phase. Alternatively, the strong solvent can be blended with an organic liquid which, whilst not destroying the solvency power of strong solvent, is itself a suitable non-solvent for the adsorbed polymer when the strong solvent is removed during the modification step.

It should be noted that even in the first-mentioned modification step in which non-solvent is added it may be desirable subsequently to remove the strong solvent from the mixture and that if this is to be done by distillation, the strong solvent should be of lower boiling point that that of the non-solvent.

As described above, and in greater detail in the aforementioned British and other Specifications the anchor component may be a polymeric component of similar nature to that of di-polar groups which interact specifically with complementary groups in the adsorbed polymer or encapsulating polymer.

During the dispersion polymerisation it may be necessary to add more stabiliser or a stabiliser precursor to stabilise the growing surface area of the particles particularly if, in the preparatory treatment of the solid particles, the amount of stabiliser is kept down to the minimum required to stabilise the treated particles in the modified continuous phase.

The invention is illustrated in the following Examples in which all parts are by weight.

EXAMPLE 1

| A mixture of the following ingredients: | |
|---|---|
| Red iron oxide | 14.8 parts |
| Polymer solution | 2.72 parts |
| Isobutyl cyclohexanyl phthalate | 9.18 parts | was vigorously stirred with small glass beads for 15 minutes. The dispersed pigment had a surface area of about 12m.²/gm. The polymer solution was a 27.2 percent solids solution of a random copolymer of methyl methacrylate and methacrylic acid (98/2) of molecular weight about 35,000 in a mixture of butyl acetate and ethyl acetate in a proportion of 1:2. There was then added a solution in 3.4 parts butyl acetate of 0.4 part of a stabiliser having a molecular backbone of polymethyl methacrylate of molecular weight about 30,000 to which were attached on average about 20 pendent chains of poly-12-hydroxy stearic acid of molecular weight about 1,800. After this solution had been stirred in, 22.25 parts of aliphatic hydrocarbon (boiling point about 75°C.) were then added with continuous stirring.

The dispersion of treated pigment was filtered to remove the glass beads, 0.13 part azodiisobutyronitrile was added and the mixture heated to reflux temperature. Over a period of 3 hours the following mixture was then added:

| | |
|---|---|
| Methyl methacrylate | 32.50 parts |
| Methacrylic acid | 0.66 part |
| 33% solution of above stabiliser in aliphatic hydrocarbon | 1.0 part |
| Aliphatic hydrocarbon (b.pt. 75°C.) | 12.85 parts |
| Azodiisobutyronitrile | 0.07 part |

The mixture was maintained at reflux for a further half an hour after the monomer addition to ensure complete polymerisation. In the resulting dispersion all the pigment particles were encapsulated in approximately spherical polymer particles of average size 0.8 - 1.5$\mu$. There were no detectable pigment-free polymer particles.

EXAMPLE 2

4.05 parts of thio indigo red were mixed with 2.69 parts of isobutyl methylcyclohexyl phthalate and a solution in 13.35 parts of butyl acetate of 4.3 parts of a random copolymer of methyl methacrylate and methacrylic acid of molecular weight about 35,000 and 1.7 parts of a graft copolymer comprising polylauryl methacrylate as one polymeric component and a random copolymer of methyl methacrylate and methacrylic acid (98:2) as another polymeric component.

The mixture was ball-milled for 18 hours to disperse the pigment, 26.08 parts of aliphatic hydrocarbon (boiling range 70°- 90°C.) then being added with stirring.

0.52 part azodiisobutyronitrile was then added to the stable pigment dispersion, it was heated to reflux temperature and over a period of three hours the following mixture was added:

| | |
|---|---|
| Methyl methacrylate | 32.00 parts |
| Methacrylic acid | 0.52 part |
| Aliphatic hydrocarbon (boiling range 70°C. – 90°C.) | 14.19 parts |
| Azodiisobutyronitrile | 0.52 part |

The mixture was maintained at reflux for a further half an hour after the monomer addition to ensure complete polymerisation. In the resulting dispersion all the pigment particles were encapsulated in approximately spherical polymer particles of average particle size 0.05 – 0.2$\mu$.

EXAMPLE 3

Example 2 was repeated using 5.0 parts vegetable black pigment in place of the thio indigo red. The black pigment had a surface area of about 34 m.²/gm.

A similar dispersion of polymer-encapsulated pigment was obtained.

EXAMPLE 4

15.95 parts rutile titanium dioxide (surface area 10m.²/gm) were mixed with 2.57 parts toluene and 2.64 parts of a 30 percent solution in $\beta$-ethoxy ethyl acetate of a polymer having a backbone of polyvinyl pyrrolidone or molecular weight about 100,000 and pendent therefrom on average 10 polymethyl methacrylate chains of molecular weight about 10,000. In this structure the backbone promotes adsorption of the molecule onto the pigment particles. After ball-milling for 18 hours, 0.43 part of the stabiliser used in Example 1 but dissolved in 3.8 parts of toluene was added followed by 29.8 parts of aliphatic hydrocarbon (boiling range 70°- 90°C.).

To the resulting stable dispersion of treated pigment was added 0.11 part azodiisobutyronitrile. The dispersion was heated to reflux and to it was added over a period of 3 hours the following mixture:

| | |
|---|---|
| Methyl methacrylate | 30.90 parts |
| Methacrylic acid | 0.63 Part |
| 33% solution of above stabiliser in aliphatic hydrocarbon | 0.95 part |
| Aliphatic hydrocarbon (boiling range 70°C. - 90°C.) | 12.20 parts |
| Azodiisobutyronitrile | 0.06 part |

The mixture was maintained at reflux for a further half an hour after the monomer addition to ensure complete polymerisation. In the resulting dispersion all the pigment was encapsulated in approximately spherical polymer particles of average size $0.4 - 0.7\mu$.

EXAMPLE 5

15.95 parts rutile titanium dioxide were dispersed by ball-milling in a solution of 1.8 parts of a random copolymer of vinyl acetate and acrylic acid (weight ratio 96:4) in 3.5 parts of ethyl acetate. To the dispersion was added a solution in 3.4 parts of ethyl acetate of 0.4 part of the stabiliser of Example 1. After this solution had been stirred in, 22.25 parts of aliphatic hydrocarbon (boiling range 120°- 150°C.) were then added with continuous stirring.

The dispersion of treated pigment was filtered to remove the glass beads and the ethyl acetate content was then removed by distillation under vacuum and replaced by an equal weight of aliphatic hydrocarbon (boiling range 70°- 90°C.). 1.0 part of azodiisobutyronitrile and 7.0 parts of vinyl acetate were added and the mixture heated at reflux temperature for 1 hour. Over a period of 3 hours the following mixture was then added:

| | |
|---|---|
| vinyl acetate | 23.9 parts |
| acrylic acid | 0.63 part |
| 33% solution of above stabiliser in aliphatic hydrocarbon | 1.0 part |
| Aliphatic hydrocarbon (boiling point 75°C.) | 12.85 parts |
| Azodiisobutyronitrile | 0.9 part |

The mixture was maintained at reflux for a further 1½ hours. In the resulting dispersion all the pigment particles were encapsulated in approximately spherical polymer particles.

EXAMPLE 6

60.9 parts of rutile titanium dioxide were dispersed by ball-milling for 18 hours in a mixture of 8.7 parts of isobutyl cyclohexyl phthalate and a solution in 21.3 parts ethyl acetate of 6.1 parts of a copolymer of methyl methacrylate/methacrylic acid (weight ratio 98:2) and 3 parts of a graft copolymer comprising polylauryl methacrylate as one polymeric component and a random copolymer of methyl methacrylate and methacrylic acid (weight ratio 98:2) as the other component. To 400 parts of the dispersion were added with vigorous stirring 250 parts of aromatic-free aliphatic hydrocarbon (boiling range 140°- 190°C.). The mixture was filtered and the ethyl acetate removed by distillation under vacuum.

762 parts of 248 parts of aromatic-free aliphatic hydrocarbon (boiling range 70°- 90°C.) and 8.8 parts of azobisdiisobutyronitrile (94 percent pure) were then added and the mixture was heated to reflux temperature. A mixture of 458 parts of vinyl acetate, 207 parts of aromatic-free aliphatic hydrocarbon (boiling range 70°- 90°C.) and 7.0 parts of azobisdiisobutyronitrile was added over 2½ hours. The product was a dispersion of titanium dioxide particles encapsulated in vinyl acetate. The particles were of wide size distribution and consisted on encapsulated mono-particles and multiplets.

EXAMPLE 7

16 parts of rutile titanium dioxide were ball-milled for 18 hours in a solution in 4.2 parts of ethyl acetate in 1.4 parts of the random copolymer as described in Example 2 and 0.7 part of the graft copolymer as described in Example 2. 70 parts of aliphatic hydrocarbon (boiling range 120°- 150°C.) were added with vigorous stirring and the ethyl acetate was removed by distillation under vacuum.

The dispersion was placed in a stirred autoclave and 0.15 part of diisopropyl peroxy dicarbonate added. The autoclave was purged with nitrogen, 30 parts vinyl chloride added and the charge heated at 50°C. for 8 hours.

The product was a dispersion of pigment encapsulated in polyvinyl chloride, the encapsulated particles being of the order of ½$\mu$ in diameter.

We claim:

1. A process of producing a stable dispersion of solid particles encapsulated in synthetic polymer comprising
forming a dispersion of said particles in a solution of an undercoating polymer and a stabilizing material and modifying said solution so that said undercoating polymer becomes insoluble therein, thereby forming particles undercoated with the undercoating polymer,
carrying out dispersion polymerization of monomer in an organic liquid containing 0 to 25 percent by weight water in which the monomer is soluble to the extent of at least about twice the highest free monomer content arising during the polymerization, and in which the resulting polymer is insoluble, the organic liquid also containing (i) a dispersion stabilizer comprising (a) an anchoring component which is a polymer or copolymer of at least one ethylenically unsaturated monomer and which is insoluble in the liquid and is associated with said encapsulating polymer by London or vander Waals interaction and (b) a pendant chain-like component of at least twelve covalently linked atoms in length which is solvated by the organic liquid and provides a stabilizing sheath around the encapsulated particles and (ii) said undercoated particles, said stabilizing material comprising an anchoring component which is associated with said undercoating polymer and a chain-like component which is solvated by said organic liquid and provides a stabilizing sheath around the undercoated particles, said dispersion polymerization forming an encapsulating layer of said resulting polymer on said undercoated particles and said dispersion stabilizer stabilizing said encapsulated particles in said organic liquid.

2. A process as claimed in claim 1 in which the proportion of solid particles to encapsulating polymer formed in the process is from 2.5 to 25 percent by volume.

3. A process as claimed in claim 1 in which the encapsulated particles produced thereby are not less than 0.75 μ in diameter.

4. A process as claimed in claim 1 in which the encapsulated particles produced thereby are not less than 1 μ in diameter.

5. A process as claimed in claim 1 in which the organic liquid at the commencement of the dispersion polymerization contains a minimum proportion of 'pure' particles of polymer of the type adsorbed on the solid particles to be encapsulated.

* * * * *